United States Patent
Kim et al.

(10) Patent No.: US 9,585,141 B2
(45) Date of Patent: Feb. 28, 2017

(54) METHOD AND APPARATUS FOR RECEIVING DOWNLINK DATA IN A WIRELESS COMMUNICATION SYSTEM

(71) Applicant: LG ELECTRONICS INC., Seoul (KR)

(72) Inventors: Bonghoe Kim, Anyang-si (KR); Dongyoun Seo, Anyang-si (KR); Suckchel Yang, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/217,930

(22) Filed: Jul. 22, 2016

(65) Prior Publication Data
US 2016/0338025 A1  Nov. 17, 2016

Related U.S. Application Data

(63) Continuation of application No. 14/395,466, filed as application No. PCT/KR2013/003360 on Apr. 19, 2013, now Pat. No. 9,419,769.

(Continued)

(51) Int. Cl.
*H04W 72/04* (2009.01)
*H04W 72/12* (2009.01)
(Continued)

(52) U.S. Cl.
CPC ......... *H04W 72/042* (2013.01); *H04L 5/0048* (2013.01); *H04L 27/2601* (2013.01); *H04W 76/046* (2013.01)

(58) Field of Classification Search
CPC ............. H04W 72/04; H04W 72/0406; H04W 72/042; H04W 72/1205; H04W 72/1278;
(Continued)

(56) References Cited

U.S. PATENT DOCUMENTS

| | | |
|---|---|---|
| 2011/0274197 A1 | 11/2011 | Zhu et al. ............... 375/267 |
| 2012/0057562 A1 | 3/2012 | Kim et al. |

(Continued)

FOREIGN PATENT DOCUMENTS

| | | |
|---|---|---|
| WO | 2010/098581 | 9/2010 |
| WO | WO 2011/008059 | 1/2011 |
| WO | 2011/083983 | 7/2011 |

OTHER PUBLICATIONS

Author Unknown, Investigation of Specification Impact of Rel. 11 CoMP, Submission No. R1-111641 to 3GPP TSG RAN WG1 Meeting No. 65, pp. 1-6, May 13, 2011.*
Author Unknown, Remaining aspects of Quasi-co-located Antenna Ports, Submission No. R1-124409 to 3GPP TSG RAN WG1 Meeting No. 70bis, Oct. 12, 2012, pp. 1-3.
Author Unknown, PDSCH mapping/CRS pattern indication for multi-cell JP CoMP, Submission No. R1-113956 to 3GPP TSG RAN WG1 Meeting No. 67, pp. 1-4, Nov. 18, 2011.
Author Unknown, Investigation of Specification Impact for Rel. 11 CoMP, Submission No. R1-112600 to 3GPP TSG RAN WG1 Meeting No. 66, pp. 1-5, Aug. 26, 2011.
Author Unknown, PDSCH Starting Symbol Indication for Cross-Carrier Scheduling, Submission No. R1-102707 to 3GPP TSG RAN WG1 Meeting No. 61, pp. 1-3, May 14, 2010.
3anasonic, "DCI for Rel-11 CoMP Operations," 3GPP TSG RAN WG1 Meeting #68bis, R1-121155, Mar. 2012, 3 pages.
European Patent Office Application Serial No. 13778865.9, Search Report dated Nov. 23, 2015, 7 pages.
Pantech, "Joint muting information in DL signaling for coherent JT CoMP," 3GPP TSG RANi #66bis, R1-113107, Oct. 2011, 4 pages.
Texas Instruments, "Downlink control signalling for DL CoMP," 3GPP TSG RAN WG1 Meeting #67, R1-113787, Nov. 2011, 3 pages.
Pantech, "Downlink Control signaling to support CoMP," 3GPP TSG RAN1 #68bis, R1-121360, Mar. 2012, 5 pages.

(Continued)

*Primary Examiner* — Christopher Crutchfield
(74) *Attorney, Agent, or Firm* — Lee Hong Degerman Kang Waimey

(57) ABSTRACT

A method for receiving downlink data in a wireless communication system is provided. A user equipment receives downlink control information via a downlink control channel in a subframe. The downlink control information includes reference signal (RS) information and physical downlink shared channel (PDSCH) information. The RS information indicates transmission antenna ports, a scrambling identity and a number of transmission layers. The user equipment receives a RS for demodulating a PDSCH based on the RS information in the subframe. The RS is generated based on the scrambling identity. The user equipment receives downlink data via the PDSCH in the subframe. Resource element (RE) mapping information on REs assigned for the PDSCH is determined based on the PDSCH information.

10 Claims, 5 Drawing Sheets

Related U.S. Application Data

(60) Provisional application No. 61/635,880, filed on Apr. 20, 2012.

(51) Int. Cl.
*H04W 72/14* (2009.01)
*H04L 5/00* (2006.01)
*H04L 27/26* (2006.01)
*H04B 7/26* (2006.01)
*H04W 76/04* (2009.01)

(58) Field of Classification Search
CPC ......... H04W 72/1289; H04W 12/1294; H04W 12/14
See application file for complete search history.

(56) References Cited

U.S. PATENT DOCUMENTS

| | | | |
|---|---|---|---|
| 2013/0039332 A1* | 2/2013 | Nazar | H04B 7/0452 370/330 |
| 2013/0114536 A1 | 5/2013 | Yoon | 370/329 |
| 2013/0188558 A1 | 7/2013 | Nam et al. | 370/328 |

OTHER PUBLICATIONS

PCT International Application No. PCT/KR2013/003360, Written Opinion of the International Searching Authority dated Jul. 26, 2013, 1 page.

\* cited by examiner

METHOD AND APPARATUS FOR RECEIVING DOWNLINK DATA IN A WIRELESS COMMUNICATION SYSTEM

CROSS-REFERENCE TO RELATED APPLICATIONS

This application is a continuation of U.S. patent application Ser. No. 14/395,466, filed Oct. 17, 2014, now U.S. Pat. No. 9,419,769, which is the National Stage filing under 35 U.S.C. 371 of International Application No. PCT/KR2013/003360, filed on Apr. 19, 2013, which claims the benefit of U.S. Provisional Application No. 61/635,880, filed on Apr. 20, 2012, the contents of which are hereby incorporated by reference herein in their entirety.

TECHNICAL FIELD

The present invention relates to a wireless communication and, more particularly, to a method for determining starting position of physical downlink shared channel (PDSCH) and the apparatus using the same.

BACKGROUND ART

The next generation wireless communication system under active research aims a system capable of transmitting various kinds of information such as video and wireless data, being evolved from the initial system providing voice-oriented services. The fourth-generation wireless communication currently under development subsequent to the third-generation wireless communication aims to support high speed data transmission with 1 Gbps (gigabits per second) data rate in the downlink and 500 Mbps (megabits per second) in the uplink. The main objective of wireless communication system is to provide a plurality of users with reliable communication means independent of their location and mobility. However, any wireless communication channel always reveals non-ideal characteristics such as path loss, noise, fading due to multipath, inter-symbol interference (ISI), or Doppler Effect due to mobility of user equipment (UE). Various technologies are under development to overcome non-ideal characteristics of wireless communication channels and improve reliability thereof.

Moreover, data capacity for cellular wireless systems is ever increasing according to the introduction of machine type communication (MTC) and the advent and deployment of various devices such as smart phones and tablet PCs. Various technologies are under development to meet the needs for high data capacity. For example, carrier aggregation (CA) technology and cognitive radio (CR) technology are good examples of an effort to utilize frequency bandwidth more efficiently. Also, multi-antenna technology, multi-base station collaboration technology, a direct communication system, etc. to increase data capacity within limited frequency bandwidth are being studied.

In order to improve performance of a wireless communication system, coordinated multipoint (CoMP) transmission has been proposed. CoMP is usually renamed as coordinated-multiple-input-multiple-output (co-MIMO), collaborative MIMO, network MIMO, etc. CoMP is expected to increase cell-edge UE performance and enhance average sector throughput. In general, inter-cell (ICI) reduces cell-edge UE performance and average sector throughput under multi-cell environment with frequency reuse factor 1. To mitigate ICI, the simple passive technique (i.e., fractional frequency reuse (FFR) with UE specific power control) was employed in order to provide reasonable throughput performance for the cell-edge UEs in the interference-limited environment. Instead of reducing frequency resource usage per cell, it is more beneficial to reuse ICI as a desired signal or mitigate the ICI.

For downlink case, CoMP schemes can be categorized as follows:

Joint Processing (JP): data is available at each point in CoMP cooperating set.

Joint Transmission (JT): PDSCH is transmitted from multiple points (part of or entire CoMP cooperating set) at a time. Data to a single UE is simultaneously transmitted from multiple transmission points, e.g. to (coherently or non-coherently) improve the received signal quality and/or cancel actively interference for other UEs.

Dynamic point selection (DPS): PDSCH is transmitted from one point at a time (within CoMP cooperating set).

Coordinated Scheduling/Beamforming (CS/CB): Data is only available at serving cell (data transmission from that point) but user scheduling/beamforming decisions are made with coordination among cells corresponding to the CoMP cooperating set.

For uplink case, CoMP reception implies reception of the transmitted signal at coordination among multiple, geographically separated points and CoMP schemes can be categorized as follows:

Joint reception (JR): Transmitted signal of PUSCH is received at multiple reception points.

Coordinated Scheduling/Beamforming (CS/CB): PUSCH is received only at a one point but user scheduling/beamforming decisions are made with coordination among cells corresponding to the CoMP cooperating set.

CoMP is currently an essential consideration in LTE (long term evolution)-A based on 3GPP (3rd Generation Partnership Project) TS (Technical Specification) Release 10. As disclosed in 3GPP TS 36.211 V10.4.0 (2011-12) "Evolved Universal Terrestrial Radio Access (E-UTRA); Physical Channels and Modulation (Release 10)", the physical channel in LTE-A can be divided into PDSCH (Physical Downlink Shared Channel) and PDCCH (Physical Downlink Control Channel), which are downlink channel, and PUSCH (Physical Uplink Shared Channel) and PUCCH (Physical Uplink Control Channel), which are uplink channel. The specification of the present invention proposes a method for determining starting position of PDSCH in CoMP environment.

DISCLOSURE

Technical Problem

The objective of the present invention is to provide a method and apparatus for receiving downlink data in a wireless communication system.

Another objective of the present invention is to provide a method to determine starting position of physical downlink shared channel (PDSCH) in coordinated multipoint (CoMP) environment and the apparatus using the same.

Technical Solution

In an aspect, a method for receiving downlink data in a wireless communication system is provided. The method comprises receiving downlink control information via a downlink control channel in a subframe, receiving a reference signal (RS) for demodulating a PDSCH based on the RS information in the subframe, and receiving downlink data via the PDSCH in the subframe. The downlink control information includes RS information and physical downlink shared channel (PDSCH) information. The RS information indicates transmission antenna ports, a scrambling identity and a number of transmission layers. The RS is generated based on the scrambling identity. Resource element (RE) mapping information on REs assigned for the PDSCH is determined based on the PDSCH information.

In another aspect, an apparatus in a wireless communication system is provided. The apparatus comprises a Radio Frequency (RF) unit configured to transmit and receive radio signals and a processor connected to the RF unit. The processor is configured for receiving downlink control information via a downlink control channel in a subframe, receiving a reference signal (RS) for demodulating a PDSCH based on the RS information in the subframe, and receiving downlink data via the PDSCH in the subframe. The downlink control information includes RS information and physical downlink shared channel (PDSCH) information. The RS information indicates transmission antenna ports, a scrambling identity and a number of transmission layers. The RS is generated based on the scrambling identity. Resource element (RE) mapping information on REs assigned for the PDSCH is determined based on the PDSCH information.

The RE mapping information may include a parameter indicating a starting position of the PDSCH. The starting position of the PDSCH may be determined based on the PDSCH information. The subframe may include a plurality of orthogonal frequency division multiple (OFDM) symbols having indices 0 to N−1, where N>4, and the starting position of the PDSCH indicates a OFDM symbol having an index belonging to {1, 2, 3, 4}.

Information about whether the transmission antenna ports may be associated with each other is determined based on the PDSCH information. The transmission antenna ports may be associated when properties of a first channel over which a symbol on one antenna port is conveyed is inferred from a second channel over which a symbol on the other antenna port is conveyed. The properties of the first channel may include one or more of delay spread, Doppler spread, Doppler shift, average gain, and average delay.

Advantageous Effects

The starting position of physical downlink shared channel (PDSCH) can be efficiently determined in coordinated multipoint (CoMP) environment.

MODE FOR INVENTION

The technology described below can be used for various multiple access schemes including code division multiple access (CDMA), frequency division multiple access (FDMA), time division multiple access (TDMA), orthogonal frequency division multiple access (OFDMA) and single carrier-frequency division multiple access (SC-FDMA). CDMA can be implemented by using such radio technology as universal terrestrial radio access (UTRA) or CDMA2000. TDMA can be implemented by using such radio technology as global system for mobile communications (GSM)/general packet radio service (GPRS)/enhanced data rates for GSM evolution (EDGE). OFDMA can be realized by using such radio technology as the IEEE 802.11 (Wi-Fi), IEEE 802.16 (WiMAX), IEEE 802.20, and evolved UTRA (E-UTRA). UTRA is part of specifications for universal mobile telecommunications system (UMTS). The 3GPP LTE is part of evolved UMTS (E-UMTS) using E-UTRA, which uses OFDMA radio access for the downlink and SC-FDMA on the uplink. The LTE-advanced (LTE-A) is an evolved version of the LTE.

A user equipment (UE) may be fixed or mobile and called in different terms such as a wireless device, a mobile station (MS), a user terminal (UT), a subscriber station (SS), a personal digital assistant (PDA), a wireless modem, or a handheld device.

A base station (BS) usually refers to a fixed station communicating with a UE, which is called in different terms such as an evolved-NodeB (eNB), a base transceiver system (BTS), or an access point (AP).

In what follows, the downlink (DL) refers to a communication link from a BS to a UE while the uplink (UL) from the UE to the BS. In the DL, a transmitter may be a part of the BS while a receiver a part of the UE. In the UL, a transmitter may be a part of the UE while a receiver part of the BS. In the description below, application of the present invention is described with reference to 3GPP LTE based on 3GPP TS (Technical Specification) release 8/9, or 3GPP LTE-A based on 3GPP TS release 10/11. The examples in the specification are only intended to illustrate the present invention and should not be understood to limit the invention, and the present invention can be applied to various wireless communication networks. In the following description, LTE refers to the wireless system including LTE and/or LTE-A.

Figure 1:
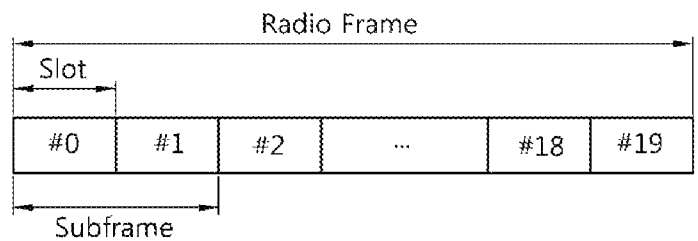
FIG. 1 illustrates a structure of a downlink radio frame in 3GPP LTE-A.

FIG. 1 illustrates a structure of a downlink radio frame in 3GPP LTE-A. The section 6 of the 3GPP TS 36.211 V10.4.0 (2012-12) "Evolved Universal Terrestrial Radio Access (E-UTRA); Physical Channels and Modulation (Release 10)" may be incorporated herein by reference.

A radio frame consists of 10 subframes indexed with 0 to 9. One subframe consists of two consecutive slots. A time required for transmitting one subframe is defined as a transmission time interval (TTI). For example, one subframe may have a length of 1 ms and one slot may have a length of 0.5 ms.

One slot may include a plurality of orthogonal frequency division multiplexing (OFDM) symbols in a time domain. Since the 3GPP LTE uses OFDMA in a downlink, the OFDM symbol is only for expressing one symbol period in the time domain, and there is no limitation in a multiple access scheme or terminologies. For example, the OFDM symbol may also be called in different terms such as a SC-FDMA symbol when SC-FDMA is used in an uplink. A resource block includes multiple consecutive subcarriers at one slot in the unit of resource allocation.

The example of the structure of a wireless frame in FIG. 1 is just one example. Therefore, the number of subframes included in the wireless frame, the number of slots included in the subframe, or the number of OFDM symbols included in the slot can be variously determined. 3GPP LTE defines that one slot includes 7 OFDM symbols in normal cyclic prefix (CP), and one slot includes 6 OFDM symbols in extended CP.

Figure 2:
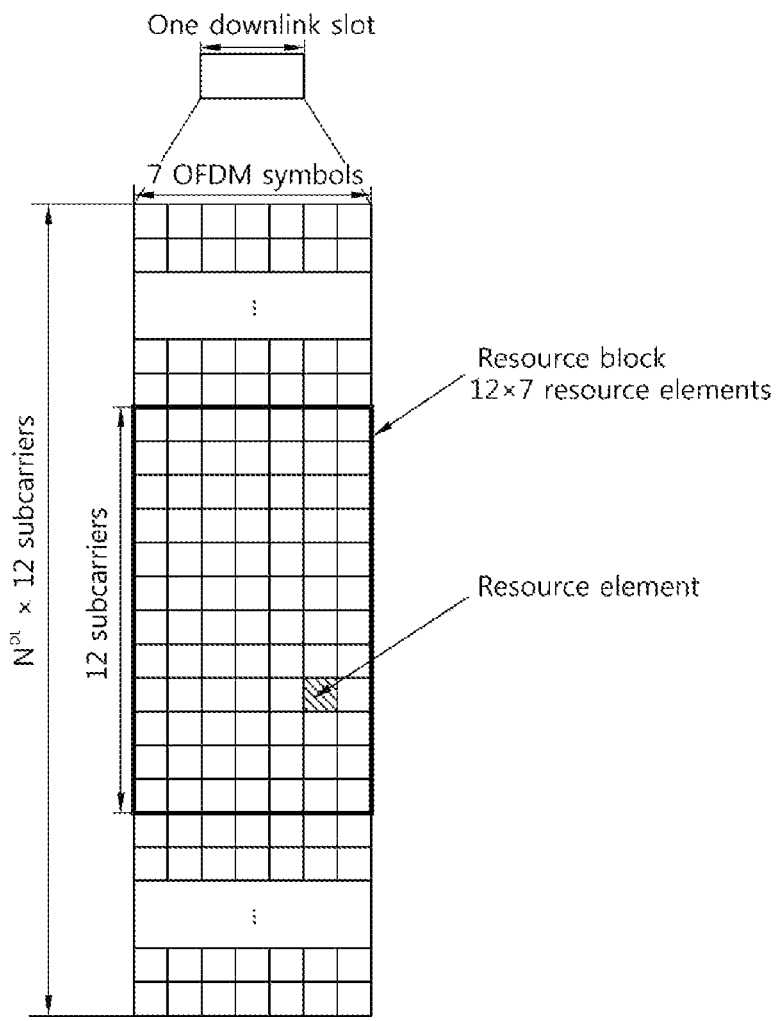
FIG. 2 illustrates an example of a resource grid for one downlink slot.

FIG. 2 illustrates an example of a resource grid for one downlink slot.

The downlink slot includes multiple OFDM symbols in time domain, and NRB resource blocks in frequency domain. The number of resource blocks included in the downlink slot, NRB, depends on the downlink transmission bandwidth configured at the cell. In LTE system, for example, NRB can be one from 6 to 110. One resource block includes multiple subcarriers in frequency domain. The structure of the uplink slot can be the same as that of the downlink slot.

Each element on the resource grid is called a resource element (RE). The element on the resource grid can be identified by the index pair (k, l) in the slot. Here, k (k=0, . . . , NRB×12−1) is the subcarrier index in frequency domain, and l (l=0, . . . , 6) the OFDM symbol index in time domain.

Although one resource block is described to include 7×12 RE composed of 7 OFDM symbols in time domain and 12 subcarriers in frequency domain in this specification, the example is for the purpose of illustration only and is not intended to limit the number of OFDM symbols and subcarriers in the resource block. The number of OFDM symbols and subcarriers can be variously modified depending on the length of CP, frequency spacing, etc.

Figure 3:
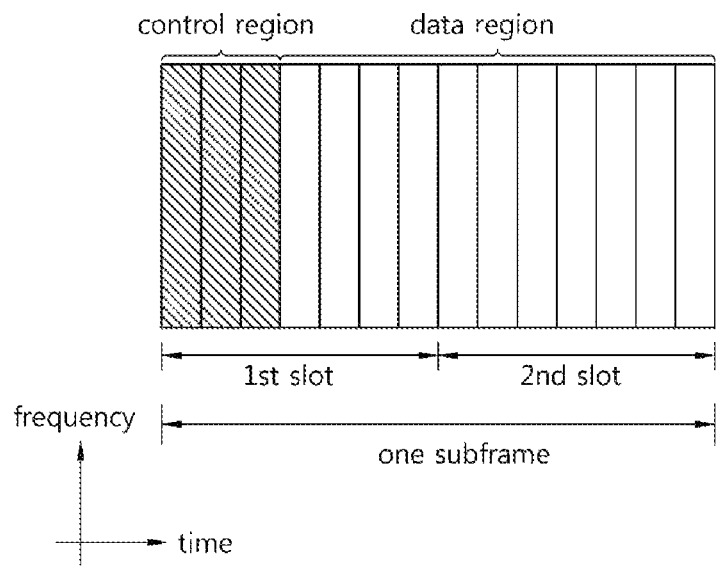
FIG. 3 illustrates a structure of a downlink subframe.

FIG. 3 illustrates a structure of a downlink subframe.

DL subframe is divided into a control region and a data region in time domain. The control region includes maximum of 4 preceding OFDM symbols of the first slot in the subframe, though the number of OFDM symbols included in the control region can be changed. In the control region, physical downlink control channel (PDCCH) and other control channels are allocated, and in the data region, physical downlink shared channel (PDSCH) is allocated.

As disclosed in the 3GPP TS 36.211 V10.4.0, the 3GPP LTE/LTE-A defines a physical channel, including a physical control format indicator channel (PCFICH), a PDCCH, and a physical hybrid-ARQ indicator channel (PHICH).

The PCFICH transmitted in the first OFDM symbol of a subframe carries control format indicator (CFI) which indicates the number of OFDM symbols (namely, size of the control region) used for carrying control channels within a subframe. The UE first receives the CFI through the PCFICH and monitors the PDCCH. The PCFICH does not use blind decoding but transmitted through the fixed PCFICH resources of a subframe.

The PDCCH carries control information which is called downlink control information (DCI). DCI may include resource allocation of PDSCH (which is also called DL grant), resource allocation of PUSCH (which is called UL grant), and activation of a set of transmission power control commands for individual UEs within a UE group and/or voice over internet protocol (VoIP).

The PHICH carries ACK (positive acknowledgement)/ NACK (negative acknowledgement) signal for UL hybrid automatic repeat request (HARQ). The ACK/NACK signal about the UL data on the PUSCH transmitted by the UE is transmitted through the PHICH.

Also, various reference signals (RSs) and synchronization signals (SSs) are transmitted in DL subframe.

A primary synchronization signal (PSS) is carried by the last OFDM symbol of a first slot (first slot of a first subframe (subframe with index 0)) and the 11th slot (first slot of a sixth subframe (subframe with index 5)). The PSS is used for obtaining OFDM symbol synchronization or slot synchronization, and associated with a physical cell identify (ID). A primary synchronization code (PSC) is a sequence used for the PSS and the 3GPP LTE defines three PSCs. According to the cell ID, one from among the three PSCs is transmitted to the PSS. The same PSC is used for each of the last OFDM symbols of the first and the 11th slot.

A Secondary Synchronization Signal (SSS) is divided into a first and a second SSS. The first and the second SSS are carried by an OFDM symbol adjacent to the OFDM symbol carrying the PSS. The SSS is used for obtaining frame synchronization. The SSS is used for obtaining cell ID together with the PSS. The first and the second SSS use secondary synchronization codes (SSCs) different from each other. In case the first and the second SSS carry 31 subcarriers respectively, two SSC sequences of length 31 are used for the first and the second SSS, respectively.

A cell-specific reference signal (CRS) can be received by all UEs in the cell, and transmitted in overall downlink bandwidths. RS sequence rl,ns(m) for CRS is defined as follows.

Math Figure 1

$$r_{l,ns(m)} = \frac{1}{\sqrt{2}}(1 - 2 \cdot c(2m)) + j\frac{1}{\sqrt{2}}(1 - 2 \cdot c(2m+1))$$

where m=0, 1, . . . , $2N_{maxRB}-1$, $N_{maxRB}$ is maximum number of RBs, ns is the slot number in the radio frame, and l is the OFDM symbol number in a slot.

Pseudo-random sequence c(i) is defined by following Gold sequence with length 31.

Math Figure 2

$$c(n)=(x_1(n+N_c)+x_2(n+N_c))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$

where $N_c$=1600, and the first m-sequence is initialized as $x_1(0)$=1, $x_1(n)$=0, and m=1, 2, . . . , 30.

The second m-sequence is initialized as $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is physical cell identity (PCI) of the cell, $N_{CP}$=1 in normal CP and $N_{CP}$=0 in extended CP.

Also, a UE-specific reference signal (URS) can be transmitted. Although CRS is transmitted in overall region of the subframe, URS is transmitted in the data region of the subframe and used for demodulation of corresponding PDSCH. URS is also referred to as dedicated reference signal (DRS) or demodulation reference signal (DM-RS).

URS is transmitted only at the RB to which corresponding PDSCH is mapped, and is used only by the UE receiving the corresponding PDSCH. RS sequence for URS $r_{ns}(m)$ is the same as that of Math FIG. 1. Here, m=0, 1, . . . , $12N_{PDSCH,RB}-1$, and $N_{PDSCH,RB}$ is the number of RBs transmitting the corresponding PDSCH. Pseudo-random sequence generator is initialized as $c_{init}$=(floor(ns/2)+1) $(2N^{cell}_{ID}+1)2^{16}+n_{RNTI}$ at the start of each subframe. $n_{RNTI}$ is identifier of a UE.

URS can also be transmitted by multiple antennas as well as by single antenna. When URS is transmitted by multiple antennas, pseudo-random sequence generator is initialized as $c_{init}$=(floor(ns/2)+1)$(2N^{cell}_{ID}+1)2^{16}+n_{SCID}$ at the start of each subframe. The parameter $N_{SCID}$ is obtained from DL grant (e.g., DCI format 2B or 2C) related to PDSCH transmission.

Meanwhile, PDCCH is monitored in the limited region of the control region in the subframe, and CRS transmitted from all bandwidth is used for demodulation of PDCCH. As the types of control information are diversified and the amount of control information is increased, there has been emerged the problem of lack of flexibility in scheduling when only conventional PDCCH transmission is used. Also, enhanced physical downlink control channel (EPDCCH) is being introduced in order to reduce the burden caused by CRS transmission.

Figure 4:
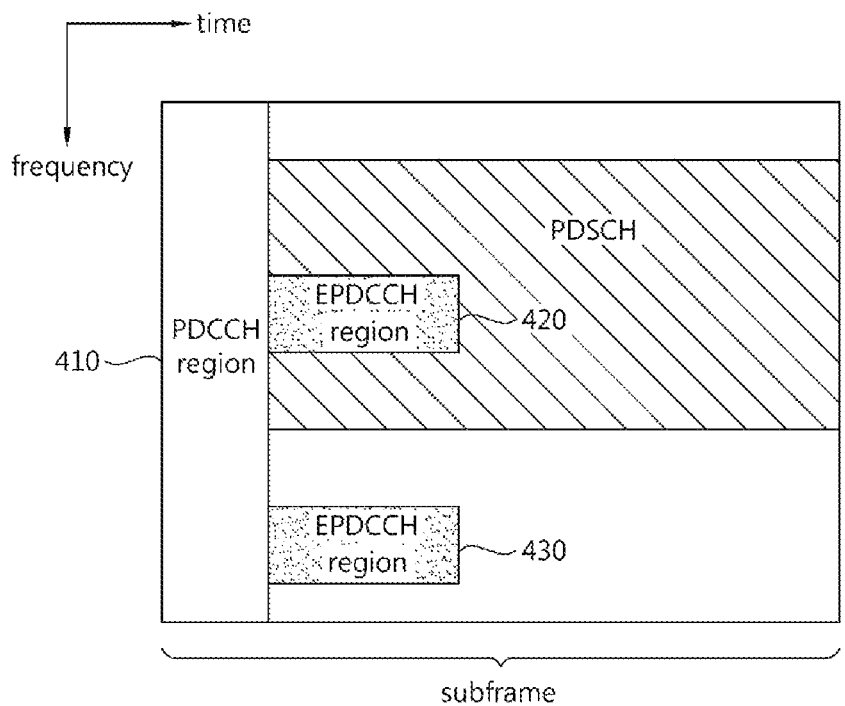
FIG. 4 illustrates an example of the subframe having EPDCCH.

FIG. 4 illustrates an example of the subframe having EPDCCH.

Referring to FIG. 4, the subframe having EPDCCH can include one PDCCH region 410 and one or more EPDCCH regions 420, 430.

EPDCCH region 420, 430 are the regions in which a UE monitors EPDCCH. EPDCCH regions 420, 430 can be flexibly scheduled in the OFDM symbol after the PDCCH region 410 while PDCCH region 410 is located in maximum of 4 OFDM symbols preceding the subframe.

One or more EPDCCH regions 420, 430 can be designated to a UE, and the UE can monitor EPDCCH at the designated EPDCCH regions 420, 430.

The number/location/size of EPDCCH regions 420, 430 and/or the information on the subframe for monitoring EPDCCH can be informed to the UE by the BS through RRC (radio resource control) message, etc.

In PDCCH region 410, PDCCH can be demodulated based on CRS. In EPDCCH regions 420, 430, DM-RS can be defined for demodulating EPDCCH rather than CRS. Corresponding DM-RS can be transmitted in corresponding EPDCCH region 420, 430.

RS sequence $r_{ns}(m)$ for DM-RS is the same as that in Math FIG. 1. At this step, m=0, 1, . . . , $12N_{RB}-1$, and $N_{RB}$ is the number of maximum RBs. Pseudo-random sequence generator can be initialized as $c_{init}$=(floor(ns/2)+1) $(2N_{ePDCCH,ID}+1)2^{16}+n_{EPDCCH,SCID}$ at the start of each subframe, where ns is slot number in a radio frame, $N_{ePDCCH,ID}$ the cell index related to the corresponding EPDCCH region, and $n_{EPDCCH,SCID}$ the parameter given from upper layer signaling.

Each EPDCCH region 420, 430 can be used for scheduling of different cells. For example, the EPDCCH in EPDCCH region 420 can carry scheduling information for the first cell, and the EPDCCH in EPDCCH region 430 can carry scheduling information for the second cell.

When EPDCCH is transmitted by multiple antennas in EPDCCH regions 420, 430, it is assumed that the same precoding is applied to the DM-RS in EPDCCH regions 420, 430 as that applied to EPDCCH.

Figure 5:
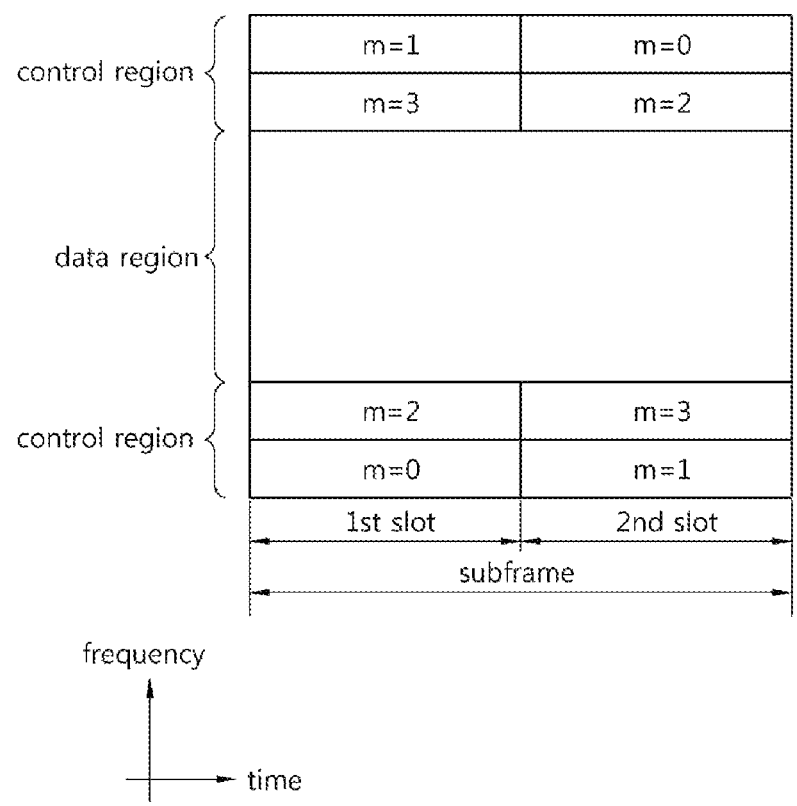
FIG. 5 illustrates a structure of an uplink subframe.

FIG. 5 illustrates a structure of an uplink subframe.

The uplink subframe can be divided into a control region and a data region in frequency domain. To the control region is allocated physical uplink control channel (PUCCH) for uplink control information to be transmitted. To the data region is allocated physical uplink shared channel (PUSCH) for data to be transmitted.

PUCCH for one UE is allocated to the resource block pair (RB pair) at the subframe. The resource blocks belonging to the RB pair occupy subcarriers which are different each other at the first and second slots. The frequency occupied by the resource blocks belonging to the RB pair allocated to PUCCH is changed based on the slot boundary. In this process, it is that RB pair allocated to PUCCH is frequency-hopped at the slot boundary. By transmitting the uplink control information through different subcarriers according to the time by the UE, frequency diversity gain can be obtained. The location index, m, represents the logical location of the RB pair allocated to PUCCH at the subframe in frequency domain.

The uplink control information transmitted on PUCCH includes HARQ ACK/NACK, channel quality indicator (CQI) representing downlink channel state, and scheduling request (SR) which is an uplink wireless resource allocation request.

Meanwhile, as demands for high transmission throughput is rising, carrier aggregation (CA) supporting multiple cells can be applied in LTE-A. CA is often referred to as different names such as bandwidth aggregation. CA means constructing a wideband by collecting one or more carriers having bandwidths which are smaller than the target wideband when the wireless communication system tries to support wideband. When collecting one or more carriers, targeted carriers can use the bandwidth used in the legacy system without change for backward compatibility. For example, bandwidth of 1.4 MHz, 3 MHz, 5 MHz, 10 MHz, 15 MHz and 20 MHz are supported in 3GPP LTE while, in 3GPP LTE-A, wideband of more than 20 MHz can be constructed by using the bandwidths of 3GPP LTE system. Otherwise, the wideband can be constructed by defining new bandwidth instead of using bandwidth of legacy systems.

Multiple BSs and UEs can communicate through maximum of 5 cells. These 5 cells can correspond to maximum 100 MHz of bandwidth. In other words, CA environment represents the case where a specific UE has two or more of configured serving cell (hereinafter referred to as 'cell') with different carrier frequencies. The carrier frequency represents the center frequency of the cell.

The cell represents the combination of DL resources and optionally UL resources. In other words, the cell necessarily includes DL resources and can optionally include UL resources which are combined with the DL resources. DL resource can be DL component carrier (CC). UL resource can be UL CC. When a specific UE has one configured serving cell, it can have one DL CC and one UL CC. When a specific UE has two or more configured serving cells, it can have DL CCs of the same number as that of cells and UL CCs of less than or equal to number of the cells. In other words, when CA is supported in the current LTE-A, the number of DL CCs can be the same as or more than the number of UL CCs. However, in the new release after LTE-A, CA with smaller number of DL CCs than the number of UL CCs can be supported.

Linkage between the carrier frequency of DL CC and the carrier frequency of UL CC can be indicated by the system information transmitted over DL CC. The system information can be SIB2 (system information block type2).

Figure 6:
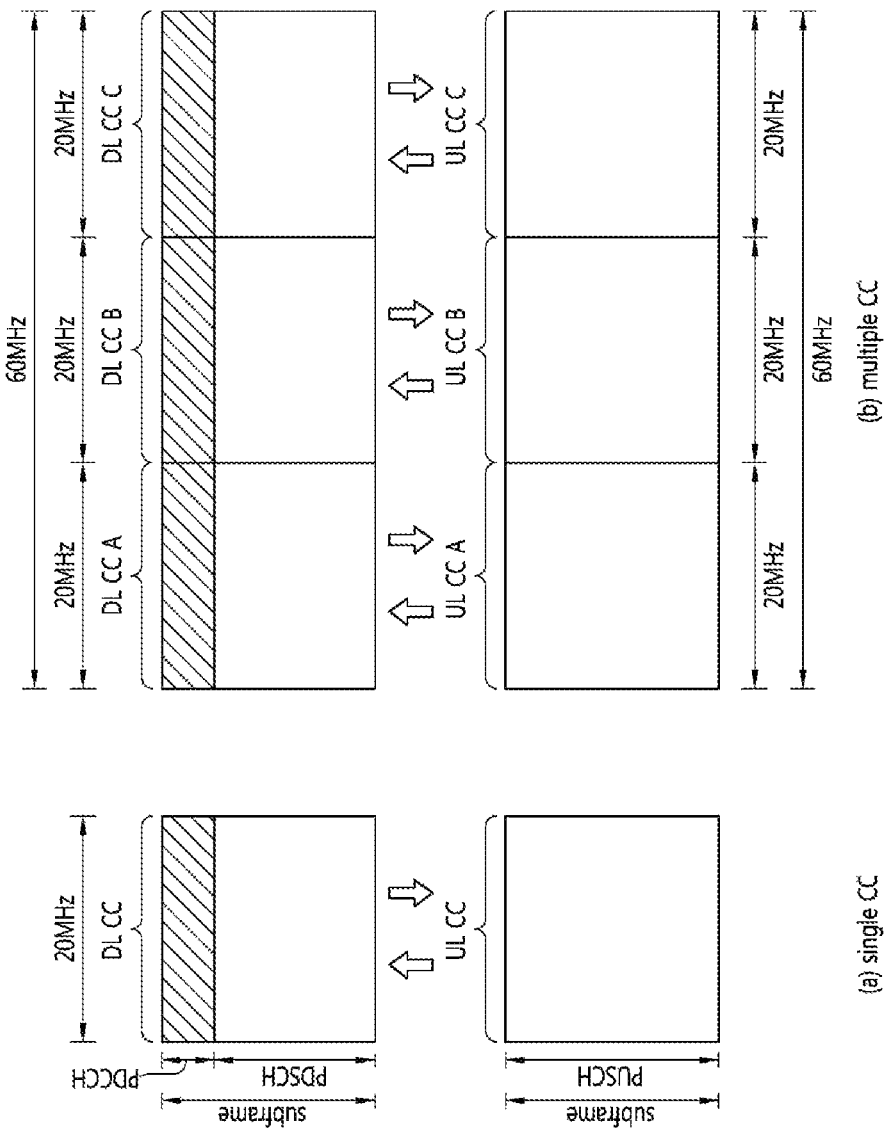
FIG. 6 illustrates one example of the structure of a subframe in single carrier system and multiple carrier system.

FIG. 6 illustrates one example of the structure of a subframe in single carrier system and multiple carrier system.

FIG. 6-(*a*) illustrates a single carrier system. The system bandwidth in FIG. 6-(*a*) is assumed to be 20 MHz. Since the number of carrier is 1, the bandwidth of DL CC transmitted by the BS and UL CC transmitted by the UE are also 20 MHz respectively. The BS carries out DL transmission through DL CC, and the UE carries out UL transmission through UL CC.

FIG. 6-(*b*) illustrates a multiple carrier system. System bandwidth in FIG. 6-(*b*) is assumed to be 60 MHz. Downlink bandwidth is composed of DL CC A, DL CC B and DL CC C, each having bandwidth of 20 MHz respectively. Uplink bandwidth is composed of UL CC A, UL CC B and UL CC C, each having bandwidth of 20 MHz respectively. The BS performs DL transmission through DL CC A, DL CC B and DL CC C, and the UE performs UL transmission through UL CC A, UL CCB and UL CC C. DL CCA and UL CC A, DL CCB and UL CC B, and, DL CC C and UL CC C can correspond to one another.

The UE can monitor and/or receive DL signal and/or data transmitted from multiple DL CCs simultaneously. The BS can construct DL CC cell-specifically or UE-specifically so that only DL signal and/or data which is transmitted from a smaller number M of DL CCs than the number N of DL CCs controlled by the cell is monitored. Also, the BS can construct a number L of DL CCs cell-specifically or UE-specifically so that DL signal and/or data which is transmitted through a number L of DL CCs from among a number M of DL CCs are monitored in priority.

The UE supporting CA can use a primary cell (PCell) and at least one secondary cell (SCell) for increased bandwidth. In other words, when there are two or more cells, one cell becomes a PCell and other cells become Scells. Both PCell and SCells can be serving cells. The UE that does not support CA or the UE in the state of RRC_CONNECTED can have only one serving cell including PCell only. The UE in the state of RRC_CONNECTED which supports CA can have at least one serving cell including a PCell and at least one SCell.

PCell can be the cell operating at primary frequency. PCell can be the cell that the UE performs RRC connection with the network. PCell can be the cell with the smallest cell index. PCell can be the cell to which the UE tries random access through physical random access channel (PRACH) from among a plurality of cells. PCell can be the cell that the UE performs initial connection establishment procedure or connection re-establishment procedure in CA environment. Or, PCell can be the cell indicated by handover procedure. The UE can acquire non-access stratum (NAS) mobility information (e.g. tracking area indicator (TAI)) through PCell during RRC connection/reconfiguration/handover. Also, the UE can acquire security input through PCell during RRC reconfiguration/handover. The UE can get allocated and transmit PUCCH only in PCell. Also, the UE can apply system information acquisition and system information change monitoring to PCell only. The network can change PCell of the UE supporting CA in the process of handover through RRCConnectionReconfiguration message including MobilityControlInfo.

SCell can be the cell operating at secondary frequency. SCell is used for providing additional radio resources. PUCCH may be not allocated to SCell. The network, when adding SCell, provides system information of corresponding cell to the UE in the state of RRC_CONNECTED through dedicated signaling. Change of system information for SCell can be performed by release and addition of a cell, and the network can add, remove or modify SCell independently through the process of RRC connection reconfiguration using RRCConnectionReconfiguration message.

The LTE-A UE supporting CA can transmit or receive one or multiple CCs simultaneously depending on the capacity of the UE. A LTE rel-8 UE can transmit or receive only one CC when each CC constructing the CA is compatible with LTE rel-8 system. Therefore, if the numbers of CCs used in at least uplink and downlink are the same, all CCs need to be constructed to be compatible with LTE rel-8. Also, for effective use of multiple CCs, multiple CCs can be controlled by media access control (MAC). When CA is constructed at DL, the receiver in the UE should be able to receive multiple DL CCs, and when CA is constructed at UL, the transmitter in the UE should be able to transmit multiple UL CCs.

As CA environment is introduced, cross carrier scheduling can be applied. PDCCH on specific DL CC can perform scheduling of PDSCH on any one DL CC of multiple DL CCs, or scheduling of PUSCH on any one UL CC of multiple UL CCs through cross carrier scheduling. Carrier indicator field (CIF) can be defined for cross carrier scheduling. CIF can be included in the DCI format transmitted via PDCCH. The presence of CIF in the DCI can be indicated semi-statically or UE-specifically by an upper layer. When cross carrier scheduling is performed, CIF can indicate DL CC to which PDSCH is scheduled or UL CC to which PUSCH is scheduled. CIF can be fixed 3 bit format, and can be located at fixed location regardless of the size of DCI format. When CIF does not exist in DCI format, the PDCCH on specific DL CC can perform scheduling of PDSCH on the same DL CC, or scheduling of PUSCH on the UL CC which is SIB2 connected to the specific DL CC.

When cross carrier scheduling is performed by using CIF, the BS can allocate PDCCH monitoring DL CC set in order to reduce the complexity of blind decoding at the UE. PDCCH monitoring DL CC set is a part of the overall DL CC, and the UE performs blind decoding only for PDCCHs in PDCCH monitoring DL CC set. In other words, the BS, in order to perform scheduling of PDSCH and/or PUSCH for the UE, can transmit PDCCH only through DL CCs in the PDCCH monitoring DL CC set. The PDCCH monitoring DL CC set can be configured UE-specifically, UE group-specifically or cell-specifically.

Figure 7:
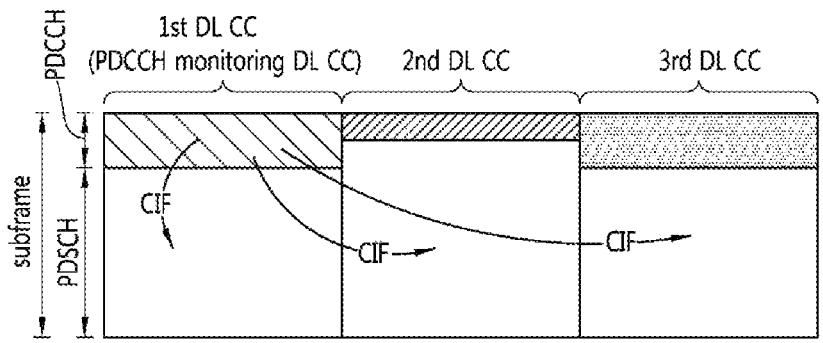
FIG. 7 illustrates one example of the structure of subframe of 3GPP LTE-A system in which cross carrier scheduling is performed through CIF.

FIG. 7 illustrates one example of the structure of subframe of 3GPP LTE-A system in which cross carrier scheduling is performed through CIF.

Referring to FIG. 7, the first DL CC among 3 DL CCs is configured as PDCCH monitoring DL CC. When cross carrier scheduling is not performed, each DL CC performs scheduling of PDSCH by transmitting each PDCCH. When cross carrier scheduling is performed, only the first DL CC configured as PDCCH monitoring DL CC can transmit PDCCH. By using the CIF, the PDCCH transferred through the first 1 DL CC can perform scheduling of the PDSCH of the second DL CC and the third DL CC as well as the PDSCH of the first DL CC. The second and third DL CCs which are not configured as PDCCH monitoring DL CC may not transmit PDCCH.

Meanwhile, cross carrier scheduling is not supported for PCell. In other words, PCell is always scheduled by its own PDCCH. The UL grant and DL assignment of the cell are always scheduled from the same cell. In other words, if DL is scheduled on the second carrier in the cell, UL is also scheduled on the second carrier. PDCCH indication can be transmitted only through PCell. Also, frame timing, and super frame number (SFN) timing can be aligned in the aggregated cell.

Also, the UE can transmit uplink control information such as channel state information (CSI), ACK/NACK, etc., which are received from one or more DL CC, or detected or measured, to the BS through predetermined one UL CC. CSI can include CQI, precoding matrix indicator (PMI), rank indicator (RI), etc. For example, when the UE needs to transmit ACK/NACK signal on the data received from multiple DL CCs, the UE can perform multiplexing or bundling of multiple ACK/NACK signals on the data received from respective DL CC to transmit the result to the BS through PUCCH of one UL CC.

When CA is supported, as described above, a specific CC can perform scheduling of PDSCH and/or PUSCH of its own or other CCs through PDCCH. The specific CC can also transmit control information through EPDCCH rather than through legacy PDCCH. In the description below, PDCCH includes PDCCH and/or EPDCCH unless stated otherwise.

Meanwhile, in LTE, as described above, RSs, SSs and control channels are transmitted through each DL carrier. However, new types of carriers, in which part or whole of RSs, SSs and control channels are not transmitted, are expected to be introduced in the next system to solve the problem of interference between multiple cells and to improve carrier extendibility. This type is called new carrier type (NCT) or extension carrier type. The NCT can be used as a stand-alone, but can be configured and activated only in SCell.

When legacy carrier type is configured and activated in SCell, the UE can acquire the index of the starting OFDM symbol for the PDSCH transmitted from SCell by high layer signaling (i.e., RRC signaling). The index of the starting OFDM symbol for the PDSCH is represented as $l_{DataStart}$ with value between 1 and 4. In below description, PDSCH starting position means the index of the starting OFDM symbol for the PDSCH.

<Case 1>: PDSCH Starting Position in CA Environment Configured to NCT

NCT may not include PDCCH. Therefore, in general CA environment, the starting position of PDSCH using NCT can be configured as follows.

(Method 1-1) PDSCH starting position is configured to OFDM symbol#0, where OFDM symbol #0 is the first OFDM symbol in one subframe.

(Method 1-2) PDSCH starting position is configured to $l_{DataStart}$ given by high layer parameter, but $l_{DataStart}$ can have value between 0 and 4 since PDCCH may not be transmitted in NCT.

(Method 1-3) PDSCH starting position is configured to the value given by CFI transmitted through PCFICH of PCell.

Meanwhile, in order to improve performance of a wireless communication system, coordinated multipoint (CoMP) transmission has been proposed. For downlink case, CoMP schemes can be categorized as follows:

Joint Processing (JP): data is available at each point in CoMP cooperating set.

Joint Transmission (JT): PDSCH is transmitted from multiple points (part of or entire CoMP cooperating set) at a time. Data to a single UE is simultaneously transmitted from multiple transmission points (TPs), e.g. to (coherently or non-coherently) improve the received signal quality and/or cancel actively interference for other UEs.

Dynamic point selection (DPS): PDSCH is transmitted from one point at a time (within CoMP cooperating set).

Coordinated Scheduling/Beamforming (CS/CB): Data is only available at serving cell (data transmission from that point) but user scheduling/beamforming decisions are made with coordination among cells corresponding to the CoMP cooperating set.

In the below description will be described the method for determining PDSCH starting position of CoMP set including legacy carrier type and/or NCT in CoMP environment. CoMP set can include two or more cells. If the size of CoMP set is 2, for example, the CoMP set includes the first cell based on the first TP and the second cell based on the second TP. If the size of CoMP set is 3, for example, the CoMP set includes the first cell based on the first TP, the second cell based on the second TP and the third cell based on the third TP.

<Case 2>: PDSCH Starting Position in CoMP Set Configured to Legacy Carrier

In the case of JT, PDSCH starting positions in CoMP set should be identical. When DL grant of the second sell is transmitted through PDCCH of the first cell (i.e., the first cell is scheduling cell and the second cell is scheduled cell), for example, the value given by CFI transmitted through PCFICH of the first cell is configured, and then $l_{DataStart}$ given by high layer parameter of the second cell can be configured. However, since the value given by CFI and $l_{DataStart}$ given by high layer parameter can be different, PDSCH starting positions should be determined as same value by the methods describe illustratively below.

(Method 2-1-1) PDSCH starting position is determined as the value having the largest value of the index of OFDM symbol from a plurality of PDSCH starting position candidates CFI and $l_{DataStart,n}$.

For example, if DL grant of the second cell is transmitted through PDCCH of the first cell and CFI transmitted through PCFICH of the first cell is 1 and $l_{DataStart}$ given by high layer parameter of the second cell is 3, the index of the OFDM symbol, which has the largest OFDM symbol #3, is determined as the PDSCH starting position for JT.

(Method 2-1-2) PDSCH starting position is determined as a new parameter $l_{DataStartCoMP}$ for JT.

In other methods, $l_{DataStartCoMP}$ applied to all carriers in CoMP set is configured, and PDSCH starting position can be determined as the $l_{DataStartCoMP}$.

For example, the $l_{DataStartCoMP}$ can be configure to the value having the largest index of OFDM symbol from PDSCH starting position candidates as described in (Method 2-1-1).

For example, if DL grant of the second cell is transmitted through PDCCH of the first cell, the $l_{DataStartCoMP}$ can be configured to $l_{DataStart}$ given by high layer parameter of the second cell. In the case where CoMP set includes three or more cells, the $l_{DataStartCoMP}$ can be configured to the value having the largest index of OFDM symbol from a plurality of $l_{DataStart}$ given by high layer parameters in the scheduled cells.

(Method 2-1-3) $l_{DataStartCoMP}$ applied to all carriers in CoMP set is configured, and PDSCH starting position is determined as the value having the largest index of OFDM symbol from a plurality of PDSCH starting position candidates CFI and $l_{DataStartCoMP}$.

In another method, $l_{DataStartCoMP}$ applied to all carriers in CoMP set is configured, and PDSCH starting position is determined as the value having the largest index of OFDM symbol from CFI transmitted through PCFICH in the scheduling cell and the $l_{DataStartCoMP}$.

Meanwhile, in the case of DPS, PDSCH starting positions need not be identical since PDSCH transmission is carried out in only one of TPs of carriers in CoMP set. Therefore, PDSCH starting position can be determined as follows.

(Method 2-2-1) PDSCH starting position of each cell is independently configured.

When DL grant of the second cell is transmitted through PDCCH of the first cell, the value given by CFI transmitted through PCFICH of the first cell is configured, and then $l_{DataStart}$ given by high layer parameter of the second cell can be configured. If PDSCH transmission is carried out in the first cell, the PDSCH transmission is carried out based on the value given by CFI transmitted through PCFICH. If PDSCH transmission is carried out in the second cell, the PDSCH transmission is carried out based on the $l_{DataStart}$ given by high layer parameter.

For example, if DL grant of the second cell is transmitted through PDCCH of the first cell and CFI transmitted through PCFICH of the first cell is 1 and $l_{DataStart}$ given by high layer parameter of the second cell is 3, PDSCH starting position at the first cell becomes OFDM symbol #1, and PDSCH starting position at the second cell becomes OFDM symbol #3.

(Method 2-2-2) PDSCH starting position is determined as a new parameter $l_{DataStartCoMP}$ for DPS.

In other methods, $l_{DataStartCoMP}$ applied to all carriers in CoMP set is configured, and PDSCH starting position can be determined as $l_{DataStartCoMP}$.

Table 1 shows PDSCH starting position at each cell in the case where CoMP set size is 2. It is assumed that DL grant of the second cell is transmitted through PDCCH at the first cell.

TABLE 1

|  | First cell (legacy) | Second cell (legacy) |
|---|---|---|
| | PDSCH starting position for JT | |
| Method 2-1-1 | Max(CFI, $l_{DataStart,2}$) | |
| Method 2-1-2 | $l_{DataStartCoMP}$ | |
| Method 2-1-3 | Max(CFI, $l_{DataStartCoMP}$) | |
| | PDSCH starting position for DPS | |
| Method 2-2-1 | CFI | $l_{DataStart,2}$ |
| Method 2-2-2 | | $l_{DataStartCoMP}$ |

Here, CFI is the value transmitted through PCFICH of the first cell, and $l_{DataStart,n}$ is the value given by high layer parameter of the nth cell. Max(a,b) is a function for selecting maximum value of a and b.

Table 2 shows PDSCH starting position at each cell in the case where CoMP set size is 3. It is assumed that DL grants of the second and third cell are transmitted through PDCCH at the first cell.

TABLE 2

|  | First cell (legacy) | Second cell (legacy) | Third cell (legacy) |
|---|---|---|---|
| | PDSCH starting position for JT | | |
| Method 2-1-1 | Max(CFI, $l_{DataStart,2}$, $l_{DataStart,3}$) | | |
| Method 2-1-2 | $l_{DataStartCoMP}$ | | |
| Method 2-1-3 | Max(CFI, $l_{DataStartCoMP}$) | | |
| | PDSCH starting position for DPS | | |
| Method 2-2-1 | CFI | $l_{DataStart,2}$ | $l_{DataStart,3}$ |
| Method 2-2-2 | | $l_{DataStartCoMP}$ | |

CFI is the value transmitted through PCFICH of the first cell, and $l_{DataStart,n}$ is the value given by high layer parameter of the nth cell. Max(a,b,c) is a function for selecting maximum value of a, b and c.

<Case 3>: PDSCH Starting Position in CoMP Set Based on Legacy Carrier Type and NCT As described above, in the case of JT, PDSCH starting positions should be identical in CoMP set. First, assume that DCI is transmitted through PDCCH in the first cell based on legacy carrier type. The value given by CFI transmitted through PCFICH based on legacy carrier type is configured, and $l_{DataStart}$ given by high layer parameter of the second cell based on NCT can be configured. Therefore, PDSCH starting position can be determined as follows.

(Method 3-1-1) PDSCH starting position is determined as the value given by CFI transmitted through PCFICH of the first cell.

(Method 3-1-2) PDSCH starting position is determined as $l_{DataStart}$ given by high layer parameter of the second cell.

(Method 3-1-3) PDSCH starting position is determined as the value having the smallest index of OFDM symbol from a plurality of PDSCH starting position candidates CFI and $l_{DataStart,n}$.

(Method 3-1-4) PDSCH starting position is determined as the value having the largest index of OFDM symbol from a plurality of PDSCH starting position candidates CFI and $l_{DataStart,n}$.

(Method 3-1-5) PDSCH starting position is determined as a new parameter $l_{DataStartCoMP}$ for JT.

Secondly, it is assumed that DCI is transmitted through PDCCH of the first cell based on NCT. In this case, the value given by high layer parameter of the second cell based on legacy carrier type can be configured. In other words, since the UE receives DCI from the first cell based on NCT and does not receive PDCCH and/or PCFICH from the second cell based on legacy carrier type, $l_{DataStart,legacy}$ given by high layer parameter can also be configure in the second cell. Letting the value given by high layer parameter of the first cell based on NCT to be $l_{DataStart,1}$ and the value given by high layer parameter of the second cell based on legacy carrier type to be $l_{DataStart,2}$, PDSCH starting position can be determined as follows.

(Method 3-2-1) PDSCH starting position is determined as the value having the largest index of OFDM symbol from a plurality of PDSCH starting position candidates $l_{DataStart,1}$ and $l_{DataStart,2}$.

(Method 3-2-2) PDSCH starting position is determined as new parameter $l_{DataStartCoMP}$ for JT.

Meanwhile, in the case of DPS, PDSCH starting positions in the CoMP set are not necessarily identical. First, it is assumed that DCI is transmitted through PDCCH of the first cell based on legacy carrier type. Then, the value given by CFI transmitted through PCFICH of the first cell based on legacy carrier type can be configured, and $l_{DataStart}$ given by high layer parameter of the second cell based on NCT can be configured. In other methods, $l_{DataStartCoMP}$ applied to all carriers in CoMP set can be configured. In the case where PDSCH transmission based on NCT is carried out, PDSCH starting position can be determined as follows.

(Method 3-3-1) Since NCT may not include PDCCH, PDSCH starting position is configured to OFDM symbol#0.

(Method 3-3-2) PDSCH starting position is determined as $l_{DataStart}$ given by high layer parameter of the second cell.

(Method 3-3-3) PDSCH starting position is determined as the value given by CFI transmitted through PCFICH of the first cell.

(Method 3-3-4) PDSCH starting position is determined as the value having the smallest index of OFDM symbol from a plurality of PDSCH starting position candidates CFI and $l_{DataStart,n}$.

(Method 3-3-5) PDSCH starting position is determined as the value having the largest index of OFDM symbol from a plurality of PDSCH starting position candidates CFI and $l_{DataStart,n}$.

(Method 3-3-6) PDSCH starting position is determined as a new parameter $l_{DataStartCoMP}$ for DPS.

(Method 3-3-7) $l_{DataStartCoMP}$ applied to all carriers in CoMP set is configured, and PDSCH starting position is determined as the value having the largest index of OFDM symbol from a plurality of PDSCH starting position candidates CFI and $l_{DataStartCoMP}$.

Secondly, it is assumed that DCI is transmitted through PDCCH of the first cell based on NCT. In this case the value given by high layer parameter of the second cell based on legacy carrier type can be configured. In other words, since the UE receives DCI from the first cell based on NCT and does not receive PDCCH and/or PCFICH from the second cell based on legacy carrier type, $l_{DataStart,legacy}$ given by high layer parameter can also be configure in the second cell. Letting the value given by high layer parameter of the first cell based on NCT to be $l_{DataStart,1}$ and the value given by high layer parameter of the second cell based on legacy carrier type to be $l_{DataStart,2}$, PDSCH starting position can be determined as follows.

(Method 3-4-1) When PDSCH is carried out in the first cell based on NCT, PDSCH starting position is determined as $l_{DataStart,1}$. When PDSCH is carried out in the second cell based on legacy carrier type, PDSCH starting position is determined as $l_{DataStart,2}$.

(Method 3-4-2) The $l_{DataStartCoMP}$ applied to all carriers in CoMP set can be configured.

Table 3 shows PDSCH starting positions at each cell when CoMP set size is 2. It is assumed that DL grant of the second cell is transmitted through PDCCH at the first cell.

TABLE 3

| | PDSCH starting position for JT | |
|---|---|---|
| | First cell (legacy) | Second cell (NCT) |
| Method 3-1-1 | CFI | |
| Method 3-1-2 | $l_{DataStart,2}$ | |
| Method 3-1-3 | Min(CFI, $l_{DataStart,2}$) | |
| Method 3-1-4 | Max(CFI, $l_{DataStart,2}$) | |
| Method 3-1-5 | $l_{DataStartCoMP}$ | |
| | First cell (NCT) | Second cell (legacy) |
| Method 3-2-1 | Max($l_{DataStart,1}$, $l_{DataStart,2}$) | |
| Method 3-2-2 | $l_{DataStartCoMP}$ | |
| | PDSCH starting position for DPS | |
| | First cell (legacy) | Second cell (NCT) |
| Method 3-3-1 | CFI | OFDM symbol #0 |
| Method 3-3-2 | | $l_{DataStart,2}$ |
| Method 3-3-3 | | CFI |
| Method 3-3-4 | | Min(CFI, $l_{DataStart,2}$) |
| Method 3-3-5 | | Max(CFI, $l_{DataStart,2}$) |
| Method 3-3-6 | $l_{DataStartCoMP}$ | |
| Method 3-3-7 | Max(CFI, $l_{DataStartCoMP}$) | Max(CFI, $l_{DataStartCoMP}$) |
| | First cell (NCT) | Second cell (legacy) |
| Method 3-4-1 | $l_{DataStart,1}$ | $l_{DataStart,2}$ |
| Method 3-4-2 | $l_{DataStartCoMP}$ | |

Here, CFI is the value transmitted through PCFICH of the first cell, and $l_{DataStart,n}$ is the value given by high layer parameter of the nth cell. Min(a,b) is a function for selecting minimum value of a and b, and Max(a,b) a function for selecting maximum value of a and b.

Tables 4 and 5 show PDSCH starting positions at each cell when CoMP set size is 3. It is assumed that DL grants of the second and third cells are transmitted through PDCCH at the first cell.

TABLE 4

| | PDSCH starting position for JT | | |
|---|---|---|---|
| | First cell (legacy) | Second cell (legacy) | Third cell (NCT) |
| Method 3-1-4 | Max(CFI, $l_{DataStart,2}$, $l_{DataStart,3}$) | | |
| Method 3-1-5 | $l_{DataStartCoMP}$ | | |
| | First cell (NCT) | Second cell (legacy) | Third cell (legacy) |
| Method 3-2-1 | Max($l_{DataStart,1}$, $l_{DataStart,2}$, $l_{DataStart,3}$) | | |
| Method 3-2-2 | $l_{DataStartCoMP}$ | | |
| | PDSCH starting position for DPS | | |
| | First cell (legacy) | Second cell (legacy) | Third cell (NCT) |
| Method 3-3-1 | CFI | $l_{DataStart,2}$ | OFDM symbol #0 |
| Method 3-3-2 | | | $l_{DataStart,3}$ |
| Method 3-3-3 | | | CFI |
| Method 3-3-3* | | | $l_{DataStart,2}$ |
| Method 3-3-4 | | | Min(CFI, $l_{DataStart,2}$) |
| Method 3-3-5 | | | Max(CFI, $l_{DataStart,2}$) |
| Method 3-3-6 | $l_{DataStartCoMP}$ | | |
| | First cell (NCT) | Second cell (legacy) | Third cell (legacy) |
| Method 3-4-1 | $l_{DataStart,1}$ | $l_{DataStart,2}$ | $l_{DataStart,3}$ |
| Method 3-4-2 | $l_{DataStartCoMP}$ | | |

(Method 3-3-3*) When NCT-based PDSCH transmission is performed, PDSCH starting position is determined as $l_{DataStart}$ which is given by high layer parameter of the second cell.

TABLE 5

| | PDSCH starting position for JT | | |
|---|---|---|---|
| | First cell (legacy) | Second cell (NCT) | Third cell (NCT) |
| Method 3-1-4 | Max(CFI, $l_{DataStart,2}$, $l_{DataStart,3}$) | | |
| Method 3-1-5 | $l_{DataStartCoMP}$ | | |
| | First cell (NCT) | Second cell (legacy) | Third cell (NCT) |
| Method 3-2-1 | Max($l_{DataStart,1}$, $l_{DataStart,2}$, $l_{DataStart,3}$) | | |
| Method 3-2-2 | $l_{DataStartCoMP}$ | | |
| | PDSCH starting position for DPS | | |
| | First cell (legacy) | Second cell (NCT) | Third cell (NCT) |
| Method 3-3-1 | CFI | OFDM symbol #0 | OFDM symbol #0 |
| Method 3-3-2 | | $l_{DataStart,2}$ | $l_{DataStart,3}$ |
| Method 3-3-3 | | CFI | CFI |
| Method 3-3-4 | | Min(CFI, $l_{DataStart,2}$, $l_{DataStart,3}$) | Min(CFI, $l_{DataStart,2}$, $l_{DataStart,3}$) |
| Method 3-3-5 | | Max(CFI, $l_{DataStart,2}$, $l_{DataStart,3}$) | Max(CFI, $l_{DataStart,2}$, $l_{DataStart,3}$) |

TABLE 5-continued

| Method 3-3-6 | | $1_{DataStartCoMP}$ | |
|---|---|---|---|
| | First cell (NCT) | Second cell (legacy) | Third cell (NCT) |
| Method 3-4-1 | $1_{DataStart,1}$ | $1_{DataStart,2}$ | $1_{DataStart,3}$ |
| Method 3-4-2 | | $1_{DataStartCoMP}$ | |

CFI is the value transmitted through PCFICH of the first cell, and $1_{DataStart,n}$ is the value given by high layer parameter of the nth cell. Min(a,b,c) is a function for selecting minimum value of a, b and c, and Max(a,b,c) a function for selecting maximum value of a, b and c.

Among the methods described above, the method of configuring $1_{DataStartCoMP}$, which is applied to all carriers in CoMP set, will be described in more detail below.

In LTE system, DCI format to be monitored and search space are determined based on the transmission mode (TM) of PDSCH. Therefore, new DCI format and TM can be defined for CoMP transmission. The new DCI for CoMP transmission can include carrier indicator, resource allocation header, resource block assignment, transmitter power control (TPC) command for PUCCH, downlink assignment index, HARQ process number, RS information, SRS request, PDSCH information and HARQ-ACK resource offset.

The RS information indicates transmission antenna ports, a scrambling identity and a number of transmission layers. The URS for demodulating PDSCH is generated based on the pseudo-random sequence, and the pseudo-random sequence is initialized based on the scrambling identity.

The PDSCH information is used for determining the PDSCH RE mapping and for determining transmission antenna port quasi co-location. Here, 'quasi co-location' means that the large-scale properties of the channel over which a symbol on one antenna port is conveyed can be inferred from the channel over which a symbol on the other antenna port is conveyed. In other words, two antenna ports are said to be quasi co-located if one antenna port is associated with another antenna port. The large-scale properties include one or more of delay spread, Doppler spread, Doppler shift, average gain, and average delay.

Information on REs assigned for the PDSCH (i.e., RE mapping information) and information about whether the transmission antenna ports are associated with each other may be determined based on the PDSCH information.

For example, parameter sets for determining REs assigned for the PDSCH is configured by higher layer signaling based on the PDSCH information. The parameter sets may be includes a parameter indicating a starting position of the PDSCH and a parameter identifying CSI-RS resource configuration. The parameter indicating a starting position of the PDSCH can have the value between 1 and 4 (0 to 4 in the case of NCT). In other words, the starting position of the PDSCH may indicate a OFDM symbol having an index belonging to {1, 2, 3, 4}. If the starting position of the PDSCH does not belong to {1, 2, 3, 4}, the starting position of the PDSCH can be determined based on lDataStart provided by the high layer parameter or based on the CFI transmitted through PCFICH.

Figure 8:
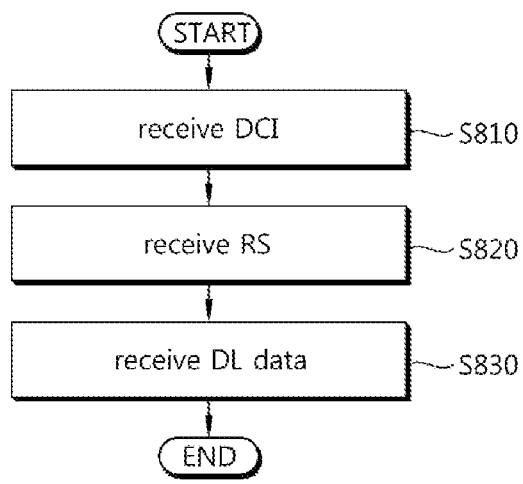
FIG. 8 illustrates a method for receiving downlink data in a wireless communication system according to one embodiment of the present invention.

FIG. 8 illustrates a method for receiving downlink data in a wireless communication system according to one embodiment of the present invention.

A UE receives DCI via a downlink control channel in a subframe (S810). The downlink control channel may include a PDCCH and/or an EPDCCH. The DCI may include RS information and PDSCH information. The RS information indicates transmission antenna ports, a scrambling identity and a number of transmission layers. Information on REs assigned for the PDSCH and information about whether the transmission antenna ports are associated with each other may be determined based on the PDSCH information. Also, the RE mapping information may include a parameter indicating a starting position of the PDSCH, and the starting position of the PDSCH may be determined based on the PDSCH information. For example, the starting position of the PDSCH in each carrier may be determined based on Table 1-5, and DCI may include information related to the staring position of the PDSCH $1_{DataStartCoMP}$.

The UE receives a RS based on the RS information in the subframe (S820). The RS may be a URS generated based on a pseudo-random sequence that is initialized based on the scrambling identity.

The UE receives DL data via a PDSCH in the subframe (S830). The PDSCH may be demodulated base on the RS.

Figure 9:
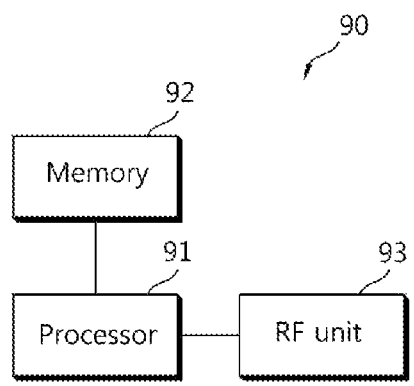
FIG. 9 illustrates an apparatus in a wireless communication system according to the embodiment of the present invention.

FIG. 9 illustrates an apparatus in a wireless communication system according to the embodiment of the present invention.

An apparatus 90 comprises a processor 91, a memory 92, and an RF unit 93. The memory 92, being connected to the processor 91, stores various pieces of information needed for operating the processor 91. The RF unit 93, being connected to the processor 91, transmits and/or receives radio signals. The processor 91 implements proposed functions, procedures, and/or methods. Operation of the UE in the embodiment described above can be realized by the processor 91.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:
1. A method for receiving downlink data in a wireless communication system, comprising:

receiving, by a user equipment (UE), a radio resource control (RRC) message including a parameter set, the parameter set including:
  a plurality of first parameters each indicating a corresponding physical downlink shared channel (PDSCH) start position, and
  a plurality of second parameters each indicating a corresponding channel state information reference signal (CSI-RS) resource;
receiving, by the UE, downlink control information (DCI) via a downlink control channel in a subframe, the DCI including:
  a first information element associated with a reference signal (RS) to be used for receiving a physical downlink shared channel (PDSCH), and
  a second information element indicating physical downlink shared channel (PDSCH) information,
wherein the first information element of the DCI indicates transmission antenna ports, a scrambling identity and a number of transmission layers, and
wherein the PDSCH information of the second information element of the DCI identifies:
  one of the plurality of first parameters of the parameter set as the start position of the PDSCH, and
  one of the plurality of second parameters of the parameter set as the CSI-RS resource; and
receiving the reference signal based on the first information element, the PDSCH based on the identified start position, and a CSI-RS via the identified CSI-RS resource.

2. The method of claim 1, wherein the antenna ports corresponding to the CSI-RS resource are quasi co-located when properties of a first channel over which a symbol on one antenna port is conveyed is inferred from a second channel over which a symbol on the other antenna port is conveyed.

3. The method of claim 2, wherein the properties of the first channel includes one or more of delay spread, Doppler spread, Doppler shift, average gain, or average delay.

4. The method of claim 1, wherein the downlink control channel includes a physical downlink control channel (PDCCH).

5. The method of claim 1, wherein the CSI-RS resource comprises quasi co-located antenna ports.

6. An apparatus in a wireless communication system, comprising:
  a Radio Frequency (RF) unit configured to transmit and receive radio signals; and
  a processor connected to the RF unit, the processor is configured to:
    receive a radio resource control (RRC) message including a parameter set, the parameter set including:
      a plurality of first parameters each indicating a corresponding physical downlink shared channel (PDSCH) start position, and
      a plurality of second parameters each indicating a corresponding channel state information reference signal (CSI-RS) resource,
    receive downlink control information (DCI) via a downlink control channel in a subframe, the DCI including:
      a first information element associated with a reference signal (RS) to be used for receiving a physical downlink shared channel (PDSCH), and
      a second information element indicating physical downlink shared channel (PDSCH) information,
    wherein the first information element of the DCI indicates transmission antenna ports, a scrambling identity and a number of transmission layers, and
    wherein the PDSCH information of the second information element of the DCI identifies:
      one of the plurality of first parameters of the parameter set as the start position of the PDSCH, and
      one of the plurality of second parameters of the parameter set as the CSI-RS resource, and
    receive the reference signal based on the first information element, the PDSCH based on the identified start position, and a CSI-RS via the identified CSI-RS resource.

7. The apparatus of claim 6, wherein the antenna ports corresponding to the CSI-RS resource are quasi co-located when properties of a first channel over which a symbol on one antenna port is conveyed is inferred from a second channel over which a symbol on the other antenna port is conveyed.

8. The apparatus of claim 7, wherein the properties of the first channel includes one or more of delay spread, Doppler spread, Doppler shift, average gain, or average delay.

9. The apparatus of claim 6, wherein the downlink control channel includes a physical downlink control channel (PDCCH).

10. The apparatus of claim 6, wherein the CSI-RS resource comprises quasi co-located antenna ports.

* * * * *